United States Patent [19]
Opitz et al.

[11] 4,384,039
[45] May 17, 1983

[54] METHOD FOR RECORDING LOCAL BOUNDARY-LAYER FLOW-LINE DIRECTIONS IN LIQUID MEDIA

[75] Inventors: Heinrich Opitz, Erlangen; Bernhard Montag, Forchheim; Gerd Urban, Erlangen, all of Fed. Rep. of Germany

[73] Assignee: Siemens Aktiengesellschaft, Berlin & Munich, Fed. Rep. of Germany

[21] Appl. No.: 355,607

[22] Filed: Mar. 8, 1982

[30] Foreign Application Priority Data

Mar. 17, 1981 [DE] Fed. Rep. of Germany ....... 3110325

[51] Int. Cl.$^3$ .......................... G03C 5/26; G03C 5/24; G01D 9/00
[52] U.S. Cl. .................................... 430/422; 430/401; 346/1.1; 346/135.1; 436/2; 73/432 R
[58] Field of Search ................... 346/1.1, 135.1; 436/2; 430/401, 422; 73/147, 432 R

[56] References Cited

U.S. PATENT DOCUMENTS

| | | | |
|---|---|---|---|
| 3,774,225 | 11/1973 | Kimmel et al. | 346/1 |
| 3,787,874 | 1/1974 | Urban | 346/1 |
| 3,890,835 | 6/1975 | Dötzer et al. | 73/147 |
| 4,259,431 | 3/1981 | Opitz et al. | 430/422 |

Primary Examiner—Mary F. Downey
Attorney, Agent, or Firm—Kenyon & Kenyon

[57] ABSTRACT

For the recording of local boundary-layer flow-line directions in liquid media by means of a photographic layer, (a) small reagent depots or deposits, with a volume of about 0.2 mm$^3$, of a water-soluble substance reactive to silver ions ("chemical flow line indicators") are applied in raster fashion to the surface which is to be exposed to the flow and which surface is previously coated with a dry or swelled photographic sheet film, (b) the reagent deposits are covered with an inert layer which is soluble in the liquid flow medium, (c) the surface so prepared is exposed to the flow of an aqueous flow medium, and (d) the film is developed according to conventional means.

The reagent deposits, which may be present as a paste, can contain a precipitation agent for silver ions. The deposits can be applied as a dot raster to the surface which is to be exposed to the flow (and which is coated with a photographic film) by means of screen printing or by means of a hole raster template. The method permits in particular the determination over a surface of the local distribution of the flow direction of flow boundary layers.

15 Claims, 5 Drawing Figures

METHOD FOR RECORDING LOCAL BOUNDARY-LAYER FLOW-LINE DIRECTIONS IN LIQUID MEDIA

BACKGROUND OF THE INVENTION

The present invention relates to a method for recording local boundary-layer flow-line directions in liquid media by means of an applied photographic layer.

The dissipation of heat occurring in all electric machines and apparatus gives rise to problems regarding cooling. The methods customarily employed in process engineering for calculating the local heat transfer coefficients of technical importance for the cooling process are, however, usually insufficient. Thus, it is necessary to rely upon experimental determination. This local convection transport coefficient is determined by the state and form of the Prandtl flow boundary layer, defined as a layer-like zone wherein friction between the core flow and the heat-exchanging surface is such that in the layer the flow velocity drops from 99.9 percent of the core flow to zero at the point of direct adhesion to the wall.

Heretofore it has been possible to determine the boundary layer properties such as local thickness, local wall shear stress, local mass and heat transfer coefficient only by individual point-by-point measurement in a time-consuming procedure and with little local resolution.

It is known from U.S. Pat. Nos. 3,774,225; 3,890,835; 3,787,874 and commonly-assigned U.S. application Ser. No. 168,245, filed July 10, 1980, to cover an entire range of local transport coefficients with high location resolution in a single measurement, whereby an efficient flow boundary layer analysis becomes possible.

The wet-film diffusion method known from U.S. Pat. No. 3,774,225 is particularly well suited for a two-dimensional display of the local heat transfer coefficients by reason of the known analogy between mass and heat transfer coefficients. Except for special cases, however, it has not yet been possible to derive the direction and magnitude of the local boundary-layer flow in liquid media from a wet film photogram of the wet-film diffusion method without substantially interfering with the core flow. FIG. 1 shows a boundary layer display, made visible by means of the wet-film diffusion method, of the heat transfer surface of a cooling cell with steady-state flow. The input and output of the coolant are indicated by arrows. Unambiguous information regarding the distribution of the local flow direction of the coolant over the surface cannot be gathered from the recording.

For optimizing problems in special heat transfer cases, in which knowledge as to the direction and amount of the often complicated flow at the heat-exchanging surface is absolutely necessary, the required data must be determined by painstaking probe measurements or by elaborate calculations. For example, it was found necessary to inject dye solutions through fine holes at the walls adjacent to the flow of interest in order to display the local flow direction of boundary flow layers.

SUMMARY OF THE INVENTION

It is therefore an object of the present invention to develop a method for liquid media which makes possible the recording of the local two-dimensional flow direction of steady-state flow boundary layers with the wet-film diffusion method.

According to the present invention, this and other objects are achieved by the provisions that (a) the surface exposed to the flow is covered with dry or swelled sheet film and small depots or deposits of reagents of about 0.2 $mm^3$ volume of a water-soluble substance reactive to silver ions ("chemical flow line indicators") are applied in raster-fashion to the film; (b) the latter is covered with an inert layer soluble in the liquid flow medium (delay layer); (c) the aqueous flow medium is directed toward the so-prepared surface; and (d) the film is developed in accordance with known procedures. With the method according to the present invention, the recording of local boundary layer flow lines is achieved without appreciable disturbance of the flow.

The dimensions of the individual reagent deposits of the water-soluble substance reactive to silver ions are beyond the rough definitions of fluid dynamics, but the relative height of the reagent depots preferably should correspond approximately to one-half the boundary layer thickness. The reactive substance converts the silver halide contained in the wet film into a highly visible silver or silver sulfide picture. The "reagent flow trail", starting from the "chemical flow line indicator" in the flow, then writes its track into the surface of the wet film by a chemical reaction with strong contrast (FIG. 2). Dot-shaped chemical flow line indicators of approximately 1 mm diameter in a raster arrangement make it possible to cover the distribution of the local flow direction of flow boundary layers over an entire area.

FIG. 3 shows the local flow direction of a heat transfer surface of a cooling cell. In the center of the picture the decrease of the horizontal component of the flow velocity in the boundary layer can be seen here from the widening of the eddy trails of the chemical flow line indicators. The deeper blackening in the center of the picture represents a decrease of the heat transfer.

For use as the chemical flow line indicators, suitable water-soluble substances which are reactive to silver ions include precipitation reagents for silver ions, for example, sulfur-containing compounds, particularly organic sulfur compounds, and water-soluble and acid-soluble inorganic sulfides, as well as reducing agents for silver halides, for example, customary photographic developers. These substances preferably are employed in the form of a paste. A highly suitable paste can be made by mixing 20 g gum arabic, 10 g thiourea and 5 ml water at room temperature.

As the delay or cover layer, gelatin-water mixtures and gum arabic-water mixtures are suitable. The delay layers are used to inhibit the recording of non-stationary flow starting processes. Suitable cover layer formers are soluble in the flow medium, are chemically inert to the wet film and release the chemically active flow line indicators only if the flow conditions are stationary. This layer is designed so that the end of the dissolution process coincides with the appearance of a steady-state flow condition of the fluid. The thickness of the delay layer preferably is about 50 $\mu$m.

Suitable delay layer formulas for the reagent depots for use in aqueous media are, for example, gelatins, gum arabic, tragacanth, polyvinyl alcohol or methyl cellulose.

The chemical flow line indicators can be applied to the wet film by a variety of methods, for example, by screen printing or by means of a suitable hole raster template. In the latter case even higher accuracy is obtained. This technique makes possible the recording of an entire field of local boundary layer flow directions. Very impressive field displays of the local boundary layer flow direction are obtained with such raster films (see FIGS. 3 to 5).

The form of the applied chemical flow line indicators is not critical and may practically be arbitrary. Triangles, squares, and the like can be chosen. However, a circular top view is most advantageous for making the raster templates. To carry out the method according to the present invention, the flow surface to be investigated is coated in daylight (to insure diffusive pre-exposure of the film) with a commercially available sheet film, for example, Agfa N 33p (from Agfa Gevaert), to which small reagent depots with a volume of about 0.2 mm$^3$ are applied in raster fashion. These depots, which preferably have the form of a spherical sector, contain either precipitation agents for silver or silver compounds or a solvent for silver halide. After the action of picture-forming precipitation agents (namely, sulfur-containing silver sulfide formers such as organic thio substances or sulfanes as well as of water-soluble and acid-soluble sulfides) or reducing agents for silver halide such as photographic developers, pictures with the correct contrast are obtained.

Picture-forming dissolving agents for silver halides include sequestering agents or complex formers such as thiosulfate, where the residual silver halide remaining in the layer is developed by subsequent photographic development to form the silver image. The half-tone picture produced has inverse tone values.

The pH-value adjusting agents necessary for the generation of pictures, such as alkaline or acid salts, for example, sequestering or complex-forming agents, are homogeneously dissolved in the flow medium. However, the procedure also can be reversed by applying the pH-adjusting agents and complex formers in reagent depots applied in raster fashion to the film and adding the picture-forming agent to the fluid, or accommodating both, namely, the pH setting agent and the picture-forming agent in the reagent depots, and exposing them to a flow of neutral water.

If the mass and concentration of the chemically active component of the chemical flow line indicators are held constant while their geometry is retained, then, for laminar flow, the form of the vortex or eddy trail with respect to its length and width is a measure of the boundary layer flow velocity and the degree of turbulence. Since flow starting processes interfere with the qualitative evaluation (as to the local flow direction) as well as with the quantitative evaluation of the chemical flow line indicators, the effect of this flow phase must be suppressed.

The chemical line indicators can be applied to the film by means of suitable hole raster templates. The template can be made from PVC foils with the desired raster content. The holes are drilled completely without burr on a high-speed drill press. The raster for the delay layer is made in a similar manner. Its holes have a diameter larger that those of the raster for the chemical flow line indicators, by about a factor of 1.5, in order to obtain full coverage of the indicator.

It can further be seen from the figures that the location of the stagnation point and the vortex trail influence each other, i.e., they are always shifted 180° relative to each other. If the position of the vortex trail axis is known, the stagnation point is known and thereby the direction of the flow line can be ascertained.

The method of the present invention finds application primarily for the two-dimensional determination of the local distribution of the flow direction of flow boundary layers.

DETAILED DESCRIPTION OF THE INVENTION

The invention is explained in further detail with reference to the following examples and figures.

EXAMPLE 1

Display of the steady-state local boundary-layer flow pattern on the heat-exchanging plane surface of a water cooling chamber for electronic assemblies.

The cooling chamber to be investigated, with the dimensions 80×80 mm, was coated in daylight on the heat exchanging surface with Agfa-Gevaert sheet film, type N33p. On the film were provided chemical flow-line indicators applied by means of a suitable raster foil. The flow line indicator consisted of 100 parts by weight gum arabic, 10 parts by weight gelatin, 20 parts by weight thiourea and water for forming the paste. The dot diameter was 1 mm and the height of the raster dot about 100 μm.

On top of this there was placed, as a cover, a delay layer consisting of 100 parts by weight gum arabic, 20 parts by weight gelatin and water for starting the paste. The thickness of the delay layer was about 50 μm.

To the flow medium, water, was added 10 percent by weight potassium hydroxide. The procedure took place at room temperature. The flow velocity was about 5 m/sec. The recording time was 3 minutes. After the recording, the film was fixed, rinsed and dried.

Figure 1:
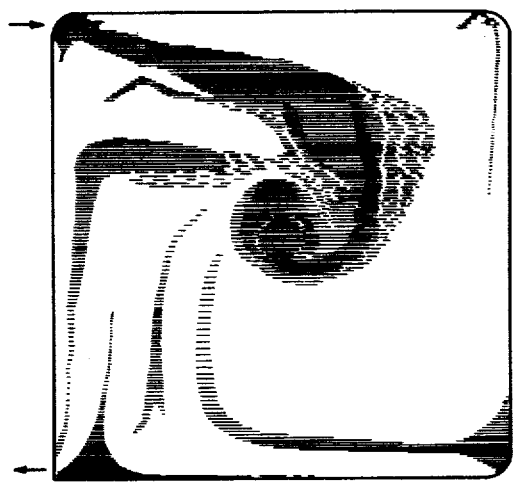
FIGS. 1-5 show local boundary layer flow line displays of the flow of aqueous media over various heat transfer surfaces.
Figure 2:
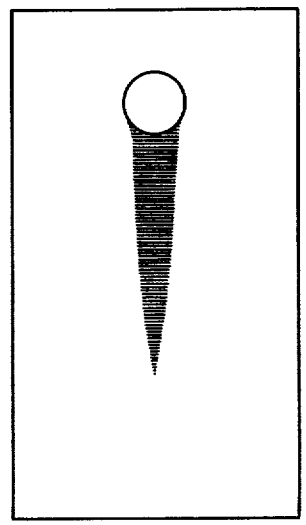
Figure 3:
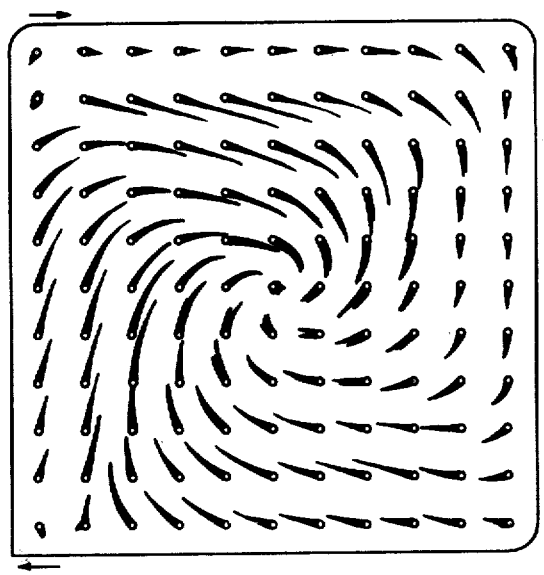

In FIG. 3 one can see in the center of the picture, from the broadening of the reactant trails of the chemical flow line indicators, the decrease of the horizontal component of the flow velocity in the flow boundary layer.

EXAMPLE 2

Change of the local boundary layer flow pattern of a plane plate against which water flows horizontally and in a steady-state, by a square-shaped disturbance body.

In a flow test channel with a flat bottom, the change of the boundary layer flow by a square disturbance body with the dimensions 15×15×8 mm is investigated.

As the recording medium served an Agfa Gevaert sheet film N33p which had been coated in daylight in raster fashion with chemical flow line indicators by means of screen printing. The indicators consisted of 100 parts by weight gum arabic, 10 parts by weight gelatin, 20 parts by weight potassium hydroxide and water for forming the paste. The dot diameter was 1 mm and the dot height about 150 μm.

As the flow medium served water at room temperature in which 20 parts by weight thioacetamide were dissolved. The flow velocity was about 5 m/sec and the recording time was 2 minutes. After recording, the film was fixed, rinsed and dried.

Figure 4:
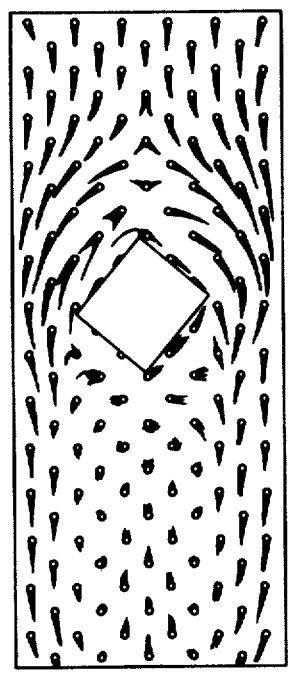

In FIG. 4, the highly pronounced stagnant water zone can be recognized on the back side of the disturbance body against which the water flows by the fact that the dot-shaped deposits of chemicals show almost no reagent trails.

EXAMPLE 3

Change of the local steady-state boundary-layer flow pattern of a plane plate against which water flows horizontally, by a cylindrical disturbance body.

The plane surface of a flow test channel was coated with photographic sheet film Agfa N33p in daylight. The film was coated with a dot raster of chemical flow line indicators which had the following composition: 100 parts by weight gum arabic, 10 parts by weight gelatin, 20 parts by weight hydroquinone, 20 parts by weight sodium hydroxide, 20 parts by weight sodium sulfite, with water for forming the paste. The diameter of the individual indicators was 1 mm and the height about 100 $\mu$m.

These indicators were exposed to neutral water of room temperature in the flow channel with a velocity of about 5 m/sec for 3 minutes. After the recording, the film was fixed and rinsed.

Figure 5:
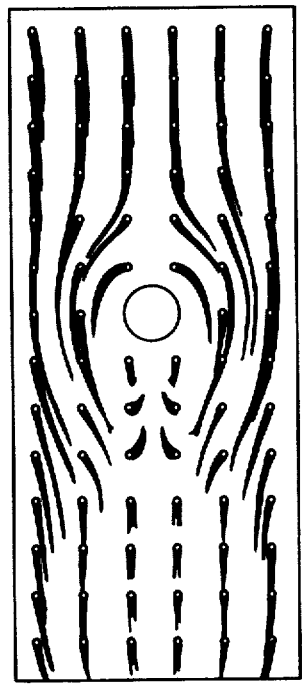

In FIG. 5, the flow reversal in the boundary layer can be seen plainly in the stagnant zone of the cylinder.

EXAMPLE 4

Display of the steady-state local boundary-layer flow pattern on the heat-exchanging plane surface of a water cooling chamber for assemblies.

The cooling chamber to be investigated, with the dimension 80×80×8 mm, was covered on the heat exchanging surface in daylight with Agfa Gevaert sheet film, type N33p. On the film were provided chemical flow line indicators applied by means of a suitable raster foil. These indicators consisted of 100 parts by weight gum arabic, 10 parts by weight gelatin, 20 parts by weight sodium thiosulfate and water for forming the paste. The dot diameter was 1 mm and the height of the raster dot approximately 100 $\mu$m.

On top thereof was provided as a cover a delay layer consisting of 10 parts by weight gum arabic, 20 parts by weight gelatin and water for starting the paste. The diameter of the delay layer was 1.5 mm.

To the flow medium, water, 5 percent by weight sodium hydrogen sulfite were added as the pH-adjusting agent. This procedure took place at room temperature. The flow velocity was approximately 5 m/sec and the recording time was 3 minutes. After being exposed, the film was then developed, rinsed, and dried. The recording is presented with inverted gray tone values with bright reagent trails on a dark background.

What is claimed is:

1. A method for recording local boundary layer flowline directions in aqueous liquid media by means of an applied photographic layer, comprising:
   (a) providing on the surface of a structure to be exposed to flowing aqueous liquid media a dry or swelled silver halide-containing photographic film sheet having thereon, in a predetermined, non-continuous pattern, small deposits of a water-soluble substance reactive to silver ions;
   (b) covering at least said deposits with a delay layer of material soluble in the flowing medium but unreactive toward components of the film sheet or the deposit thereon;
   (c) exposing the so treated surface to a flowing aqueous liquid medium; and
   (d) thereafter developing said film sheet to provide a visible image thereon.

2. The method according to claim 1 wherein said deposits on said film sheet are each of about 0.2 mm$^3$ in volume.

3. The method according to claim 2 wherein the height of said deposits is equal to about one-half of the thickness of the boundary layer of the flowing aqueous liquid medium.

4. The method according to claim 3 wherein the diameter of each of said deposits is about 1 mm.

5. The method according to claim 1 wherein said deposits are in the shape of spherical sections.

6. The method according to claim 1 wherein said deposits contain a solvent for silver halide.

7. The method according to claim 1 wherein said deposits contain a substance capable of precipitating silver ions.

8. The method according to claim 1 wherein a pH-adjusting agent is contained in the flowing aqueous liquid medium.

9. The method according to claim 1 wherein said deposits contain a water-soluble binder for the reactive substances therein.

10. The method according to claim 1 wherein said deposits are applied to said sheet film by means of screen printing.

11. The method according to claim 1 wherein said deposits are applied to said film sheet as dots by means of hole template raster.

12. The method according to claim 1 wherein said delay layer is applied to said deposits as a component of said deposits.

13. The method according to claim 1 wherein said delay layer constitutes a separately-applied cover layer applied after application of said deposits to said flow sheet.

14. The method according to claim 1 wherein the thickness of said delay layer is about 50 $\mu$m.

15. A method according to claim 8 wherein said pH-adjusting agent is potassium hydroxide and the pH of said flowing aqueous liquid medium is from about 11 to 12.

* * * * *